UNITED STATES PATENT OFFICE.

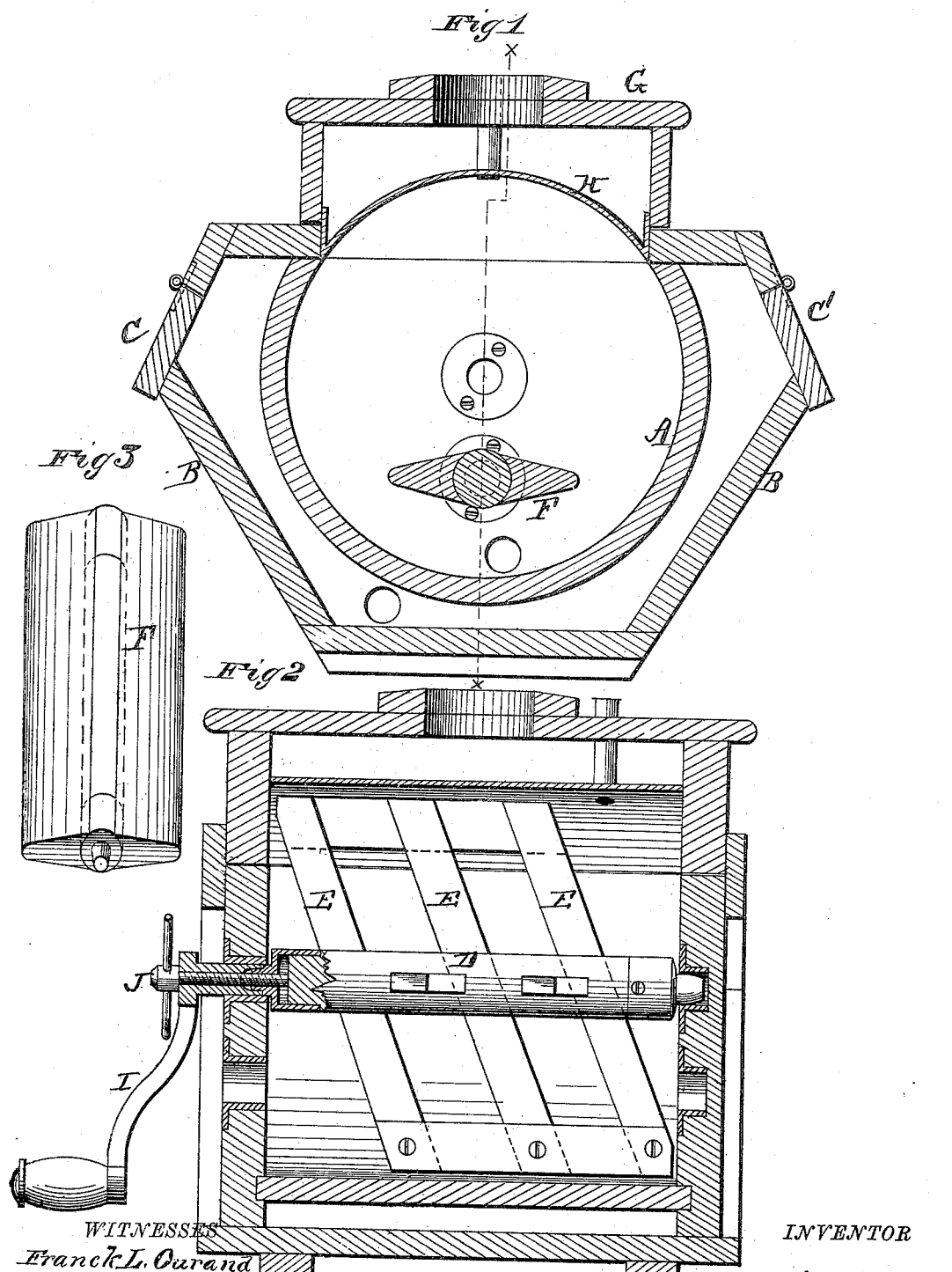

EMANUEL W. KITCHEN, OF PENN'S PARK, PENNSYLVANIA.

IMPROVEMENT IN CHURNS AND BUTTER-WORKERS.

Specification forming part of Letters Patent No. 172,450, dated January 18, 1876; application filed December 3, 1875.

*To all whom it may concern:*

Be it known that I, E. W. KITCHEN, of Penn's Park, in the county of Bucks and in the State of Pennsylvania, have invented certain new and useful Improvements in Churns; and do hereby declare that the following is a full, clear, and exact description thereof, reference being had to the accompanying drawings and to the letters of reference marked thereon, making a part of this specification.

The nature of my invention consists in the construction and arrangement of a combined churn and butter-worker, as an improvement upon Letters Patent granted to me June 9, 1874, and numbered 151,887.

In the annexed drawings, making part of this specification, Figure 1 represents a cross-section; Fig. 2, a plan view with top removed, and Fig. 3 a view of the butter-worker.

In the figures, A represents the churn proper, which is in cylindrical form, and which is surrounded with a case, B, except at its top. A space is left between the churn and the case, in which water, either warm or cold, may be placed for the purpose of tempering the cream or milk.

D represents the dasher-shaft, which lies in a horizontal position in the churn-box, and which is provided with a series of arms, E E, somewhat similar to those in my former patent. The shaft D is provided also with a suitable crank-handle for revolving the same. G represents the cover to the box A. This cover is made hollow, so that it may contain ice or warm water, as may be desirable. The under side of this cover is made of zinc or other suitable sheet-metal, and in form to correspond with the shape of the box. The opening or mouth of this cover is of course supplied with a suitable cover or door.

F represents the butter-worker, which consists of an oval board, having trunnions or bearings, which rest in openings in the sides of the box. A handle is used with this board for revolving it, and it is so located that, when it revolves, its edges come in close proximity to the circular bottom of the box and express the milk from the butter. Of course, when the worker is in use the dasher-shaft is removed.

Having thus fully described my invention, what I claim is—

1. The worker F, formed of an oval board, and provided with trunnions on its ends, in combination with the churn-cylinder A, as and for the purposes herein set forth.

2. The top G, provided with a curved metal bottom, H, forming a hollow chamber, and arranged on top of the open-top cylinder-body A, as shown and described.

In testimony that I claim the foregoing I have hereunto set my hand this 12th day of November, 1875.

EMANUEL W. KITCHEN.

Witnesses:
 RODMAN F. PUGH,
 JAMES GILKYRON.